United States Patent

Antypas

[15] 3,696,262

[45] Oct. 3, 1972

[54] MULTILAYERED III-V PHOTOCATHODE HAVING A TRANSITION LAYER AND A HIGH QUALITY ACTIVE LAYER

[72] Inventor: George A. Antypas, Mountain View, Calif.

[73] Assignee: Varian Associates, Palo Alto, Calif.

[22] Filed: Jan. 19, 1970

[21] Appl. No.: 3,661

[52] U.S. Cl...................313/94, 313/102, 317/235 R, 317/234 R, 317/275 N

[51] Int. Cl............................H01j 39/16, H01j 39/06

[58] Field of Search..........317/235, 27, 483, 42, 234, 317/8; 148/33.4, 174, 175; 313/94

[56] References Cited

UNITED STATES PATENTS

| | | | |
|---|---|---|---|
| 3,322,575 | 5/1967 | Ruehrwein | 317/235 |
| 3,441,453 | 4/1969 | Conrad et al. | 317/235 |

*Primary Examiner*—Jerry D. Craig

*Attorney*—Stanley Z. Cole and Leon F. Herbert

[57] ABSTRACT

A thin III-V photoemitter crystal having a thickness ranging from 1 micron to 5 microns as grown on a III-V substrate. The bandgap was determined in advance by proportioning the constituents of the crystal causing the peak of the response curve to occur at a predetermined energy and absorb incident photons of the desired wavelength. Due to the high quality of the crystal, the electron diffusion length thereof was comparable to the thickness allowing transmission optics to be employed. Lattice mismatch between the active crystal and the base was minimized by a transition layer, or a progression of transition layers, of intermediate composition. The presence of this strain relieving structure permitted the growth of the thin, high quality single crystals having a relatively long electron diffusion length. As a specific example, a 20 micron transition layer of $GaAs_{.90}Sb_{.10}$ was epitaxially grown on a GaAs substrate. A three micron active layer of $GaAs_{.85}Sb_{.15}$ was grown over the transition layers. This composition of the active layer exhibited a bandgap energy of 1.17 ev corresponding to an absorption wavelength of 1.06 microns.

7 Claims, 3 Drawing Figures

INVENTOR.
GEORGE A. ANTYPAS
BY
Leon F. Herbert
ATTORNEY

MULTILAYERED III-V PHOTOCATHODE HAVING A TRANSITION LAYER AND A HIGH QUALITY ACTIVE LAYER

BACKGROUND OF THE INVENTION

The invention herein was made in the course of Government Contract AF-F33615–68-C 1396 with the United States Air Force.

This invention relates to compound photoemitters and more particularly to thin multilayered photoemitters with minimum lattice mismatch.

DESCRIPTION OF THE PRIOR ART

Lattice mismatch between the various III-V semiconductors impedes the epitaxial growth of crystal layers having unit cell dimensions differing from the substrate crystal. For similar reasons previous III-V semiconductors which were grown on a glass or amorphous substrate were polycrystalline and spotty in growth resulting in short electron diffusion lengths. The active layers on these foreign substrates must be much thicker than the diffusion for sufficient crystal quality, and are therefore limited to opaque cathode optical systems. The thickness of the crystal and the shortness of the diffusion length prohibited the use of transmission optics. Robert H. Saul in his article "Effect of a $GaAs_xP_{1-x}$ Transition Zone On the Perfection of GaP Crystals Grown by Deposition onto GaAs Substrates" (JOAP, Vol. 40 No. 8 July 1969 p. 3,273–9) discloses a transition layer between two III-V semiconductor layers for mitigating thermal stresses created during the cooling step of crystal manufacture. Saul, however, does not provide a thin or single crystal active layer suitable for use in a transmission optical system.

Detection of 1.06 micron photons is of particular interest in the communication field. A prior art photocathode S-1 has been used extensively to detect at this frequency. Numerous difficulties plague the application of the S-1 photocathode, primarily a high noise level and a relatively low yield.

SUMMARY OF THE PRESENT INVENTION

It is an object of this invention to provide a compound III-V semiconductor photoemitter having low lattice mismatch and high quality crystalline structure which results in a high output low noise operation.

It is a further object of this invention to provide a compound III-V semiconductor photoemitter having a thin single crystal active layer with a predetermined response curve for absorbing incident photons of a predetermined energy.

It is another object of this invention to provide a compound III-V semiconductor photoemitter having an active layer with a free electron diffusion length comparable to the thickness of the layer.

Briefly, these and other objects of this invention are accomplished by providing a photoemitter having a plurality of layers including a substrate, an active layer, and at least one bridging or transition layer therebetween. The layers have progressively changing constituent proportions for minimizing the interlayer lattice mismatch. Because of the slight variation in elemental composition each layer has a slightly altered bandgap or response curve in progression from the first layer or substrate to the last layer or active layer. The last or *n*th layer has a bandgap energy suitable for absorbing photons of the desired frequency.

Three constituents are present in the layers in progressively changing proportions. The first constituent is a basic component and essentially comprises at least one element selected from the third column of the periodic table. The second constituent is also a basic component and essentially comprises at least one element selected from the fifth column of the periodic table. The third constituent is an additive component and essentially comprises at least one element selected from the third and fifth columns of the periodic table. The preferred effect of adding the third constituent is to lower the bandgap of the resulting crystal. That is, the energy gap of the III-V semiconductor formed by combining the three constituents is less than the energy gap of the III-V semiconductor formed by the two basic constituents. Thus, the proportion of the third constituent is progressively increased from the first layer to the *n*th layer to alleviate lattice mismatch and to progressively lower the bandgap of the layers. Accordingly, the proportion of the first or second constituent is correspondingly reduced because of the 50—50 composition between third column elements and fifth column elements that exists in growing this type of crystal.

BRIEF DESCRIPTION OF THE DRAWINGS

Other features and advantages of the present invention will become apparent upon perusal of the following specification taken in connection with the accompanying drawings wherein.

DETAILED DESCRIPTION OF THE PREFERRED EMBODIMENT

Figure 1:
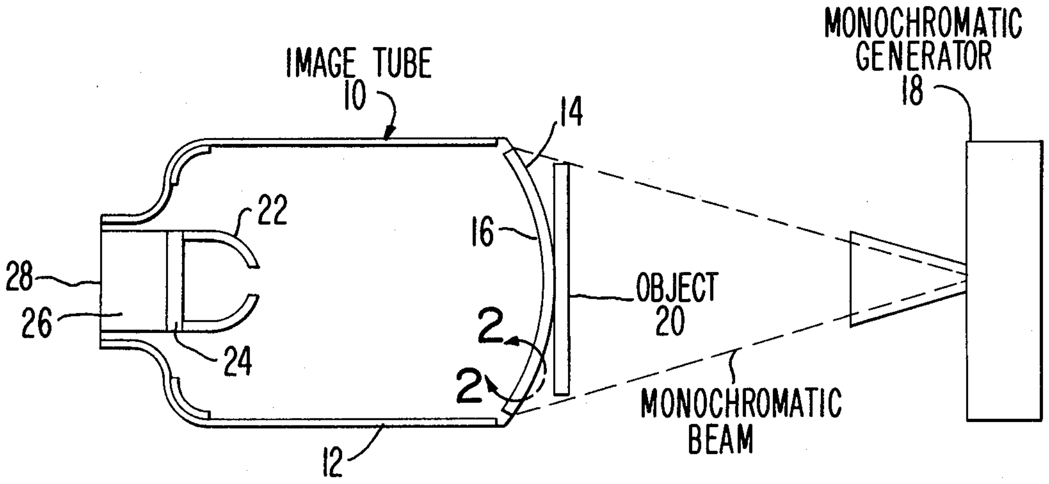
FIG. 1 is a diagrammatic view of a monochromatic imaging tube showing the novel photoemitter mounted therein.

Referring now to FIG. 1, an imaging tube 10 is shown having a vacuum envelope 12 and a light window 14 upon which the inventive photoemitter 16 is mounted. Photons to be detected emanate from a monochromatic generator 18 and pass through an object to be viewed 20 mounted immediately in front of the light window 14. Electrons emitted by the photocathode 16 are focused by a focusing electrode 22 and strike a phosphor layer 24 mounted on a glass substrate 26. The image of object 20 is viewed on an imaging screen 28. The simple transmission optical system depicted here may be employed as a result of the thin electron-transparent active layer of the inventive photoemitter 16.

Figure 2:
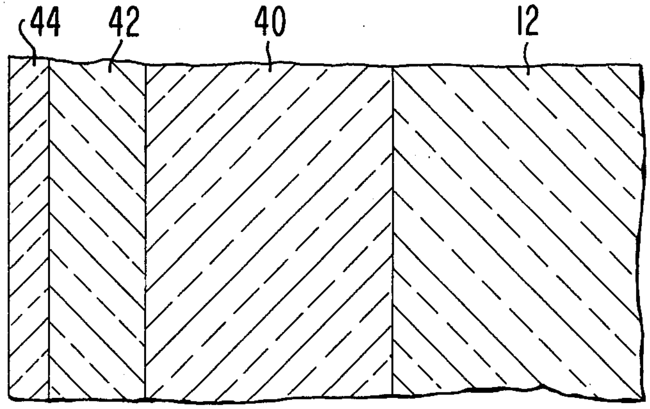
FIG. 2 is a fragmentary sectional view of a three layer photoemitter taken across lines II of FIG. 1.

FIG. 2 shows the detailed structure of photocathode 16. A substrate layer 40, which in this example is mounted on envelope 12, provides the nucleation sites for the growth of a bridging or transition layer 42 which in turn provides the proper lattice environment for growing an active layer 44. Generally, substrate 40 is a conventional two element III-V semiconductor substance such as GaAs or InP. However, substrate 40 could be a ternary or four element compound semiconductor. Transition layer 42 is a compound III-V semiconductor having the same principle or basic elements as substrate 40 in slightly changed proportions, or a small percentage of an additional element. The slight lattice mismatch between substrate 40 and transition layer 42 caused by the slightly different composition does not materially inhibit the growth of transition layer 42. Minor imperfections occuring in transition layer 42 due to this slight mismatch are alleviated as transition layer 42 increases in thickness. A 10 micron bridging thickness appears sufficient to dissipate the effects of the mismatch and exhibit a relatively imperfection free surface which provides adequate nucleation sites for growing a high quality active layer 44. A thicker transition layer of 20 or even 50 microns eliminates more dislocations and boundaries in the growing surface of transition layer 42, and permits growth of an even higher quality active layer 44. A slight lattice mismatch exists between transition layer 42 and active layer 44 because active layer 44 has a slightly altered composition or enrichment of the third element. The effect of this minor lattice mismatch is not sufficient to prevent the growth of a high quality single crystal active layer. As a result, active layer 44 may be as thin as 1 micron and function effectively as a photocathode.

Each of the plurality of layers forming photocathode 16 essentially comprises three constituents. The first constituent is an element listed under column three of the periodic table and preferably selected from the group consisting of Al, Ga, In, and Tl. The second constituent is an element listed under column five of the periodic table and preferably selected from the group consisting of P, As, Sb, and Bi. The third constituent is an element listed under column three or column five of the periodic table and preferably selected from the group consisting of Al, Ga, In, Tl, P, As, Sb, and Bi. If the substrate is a binary III-V crystal, it will be formed by only the first and second constituent. Table I below lists the III-III-V ternary combination possibilities and Table II below lists the III-V-V ternary combination possibilities of the three constituents.

TABLE I

| | | | |
|---|---|---|---|
| Al Ga P | Al Ga As | Al Ga Sb | Al Ga Bi |
| Al In P | Al In As | Al In Sb | Al In Bi |
| Al Tl P | Al Tl As | Al Tl Sb | Al Tl Bi |
| Ga In P | Ga In As | Ga In Sb | Ga In Bi |
| Ga Tl P | Ga Tl As | Ga Tl Sb | Ga Tl Bi |
| In Tl P | In Tl As | In Tl Sb | In Tl Bi |

TABLE II

| | | | |
|---|---|---|---|
| Al P As | Ga P As | In P As | Tl P As |
| Al P Sb | Ga P Sb | In P Sb | Tl P Sb |
| Al P Bi | Ga P Bi | In P Bi | Tl P Bi |
| Al As Sb | Ga As Sb | In As Sb | Tl As Sb |
| Al As Bi | Ga As Bi | In As Bi | Tl As Bi |
| Al Sb Bi | Ga Sb Bi | In Sb Bi | Tl Sb Bi |

Each layer of photocathode 16 may be grown using conventional vapor or liquid epitaxy techniques, as is indicated in the following brief description of how to make the inventive three layer photocathode using $$\text{Ga As}_{x1}\,\text{Sb}_{1-x1} - \text{Ga As}_{x2}\,\text{Sb}_{1-x2} - \text{Ga As}_{x3}\,\text{Sb}_{1-x3}$$

as a specific example. Substrate 40 is preferably Ga As ($x1 = 1$) which is grown from a seed or purchased commercially. In the other III-V compound photocathodes listed in Tables I and II, a binary III-V substrate is also preferred due to the availability of these substances. A Ga melt was provided in an oven at about 720° C starting growth temperature. The melt was then saturated with As from a Ga As source. Ga Sb was added which reduced the solubility of As and caused Ga As dendrite precipitation in equilibrium with the melt. A dopant was added to the melt — preferably element Zn. The oven was then tilted approximately 10° from the horizontal causing the melt to roll over the substrate also in the oven. The oven temperature was then lowered in accordance with a programmed cooling cycle. During this temperature decrease of about 20° C, the Ga As and Ga Sb epitaxially crystallized out in the desired proportions onto the Ga As substrate 40. Substrate 40 functions as a seed crystal in the epitaxial growth of transition layer 42 providing sufficient nucleation sites to insure good crystal growth notwithstanding the slight lattice mismatch introduced by the GaSb. Active layer 44 is then epitaxially grown on transition layer 42 by the same process only a slightly higher percentage of Sb is employed in the As-Sb starting mix. The Sb enriched initial ingredients cause an Sb enriched melt and ultimately an Sb enriched $\text{GaAs}_{x1}$ $\text{Sb}_{1-x}$ crystal. The above III-V growing technique is described in more detail in H. Nelson's article "Epitaxial Growth from the Liquid State----" appearing in the RCA Review, Dec. 1963, p. 603–15.

The progressive GaSb enrichment eases the inter-lattice strain between the layers and progressively lowers the energy gap. A properly proportioned series of layers should result in an active layer of just the right energy gap to absorb the incident photons, but of a lower bandgap than the preceding transition layer and substrate. Using a relatively low energy gap semiconductor such as GaSb to lower the energy gap of the successive layers avoids a potential difficulty that arises whenever the transition layer has an energy gap too close to the active layer. Such an arrangement could reduce the photon-to-electron conversion efficiency too the transition layer response curve may overlap into the active layer response curve causing electrons to be generated within the transition layer. Such transition layer electrons have a diffusion length less than the distance to the emission surface and therefore cannot participate in the electron emission. Incident light would be lost if the transition layer has an energy gap to close to or less than the active layer.

The following specific examples show compositions of III-V compound photocathodes having a bandgap of 1.17 electron volts designed to absorb at a wavelength of 1.06 microns. They exhibited an increase in response of five times the S-1 prior art phosphor.

EXAMPLE I $GaAs - In_{.08}Ga_{.92}As - In_{.14}Ga_{.86}As$

EXAMPLE II $InP - InAs_{.10}P_{.90} - InAs_{.17}P_{.83}$

EXAMPLE III $GaAs - GaAs_{.90}Sb_{.10} - GaAs_{.85}Sb_{.15}$

In each of the above examples the substrate was a purchased binary III-V semiconductor layer approximately 400 microns thick. The transition layers and active layers were compound III-V semiconductors about 20 microns and 3 microns thick, respectively. The exact proportions of each constituent may vary within limits from the stated ratio and still maintain effective photocathode action at 1.06 microns because of the width of their response curves at that wavelength. In addition, the inexact science of chemical analysis contributes a certain built-in error to the stated ratios. As a result, a certain variance in the stated percentages is to be expected.

Figure 3:
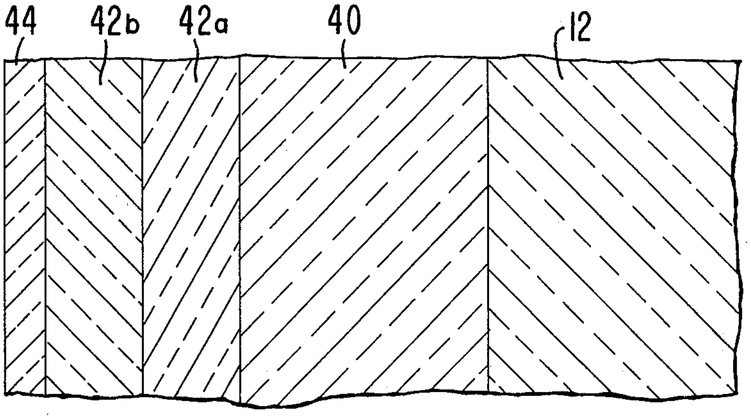
FIG. 3 is a fragmentary sectional view of an embodiment of the photoemitter shown in FIG. 2 in which an additional transition layer has been added to further relieve the strain caused by lattice mismatch.

EXAMPLE IV:

$GaAs - GaAs_{.95}Sb_{.05} - GaAs_{.90}Sb_{.10} - GaAs_{.85}Sb_{.15}$ is a four-layer example as shown in FIG. 3. Two transition layers 42*a* (20 microns) and 42*b* (20 microns) of progressively increasing proportions of Sb are epitaxially grown on substrate 40. Active layer 44 is enriched further in Sb to determine the absorption frequency. The additional transition layer further relieves lattice mismatch to facilitate crystal growth.

Clearly, many changes can be made in the above construction and widely different embodiments and applications of this invention could be made without departing from the scope thereof. For an example, any number of transition layers could be employed to distribute the potential lattice mismatch that exists between the crystalline immiscible substrates and active layers. Also, the constituent proportions can be varied widely to position the response peak in any portion of the incident photon spectrum. For instance, $GaAs_{.93}\,Sb_{.07}$ has a bandgap of 1.30 ev corresponding to a response peak of $0.95\mu$ which is displaced slightly from the peak described in specific Example III. While the particular application shown herein concerns a monochromatic imaging device, the photoemitter may be employed in a photomultiplier tube or other photon-to-electron conversion devices. It is therefore intended that all matter contained in the above description or shown in the accompanying drawings shall be interpreted as illustrative and not in a limiting sense.

Hence it is readily apparent that the present invention will provide a high quality high output thin active layer with minimum lattice strain and maximum electron diffusion distance. The progressively changing composition of the transition layers and the thickness of the transition layers mitigates the effect of the lattice mismatch between the substrate and the active layer. A polycrystalline structure having objectionable grain boundaries and impurities is avoided in the single crystal present photocathode. This harmonious circumstance promoted by the transition layer permits the resulting high quality active layer to have a thickness comparable to or less than the diffusion length of the free electrons. The low level of thermionic emission or dark current inherent in the III-V semiconductors results in a low noise output as contrasted with the thermionic activity of the S-1 phosphor.

What is claimed is:

1. The combination with a photon detection apparatus comprising:

a vacuum envelope means;

a photon window means mounted in the vacuum envelope means;

a photocathode crystal mounted proximate the window means for providing electrons within the vacuum envelope means in response to photons which penetrate the window means; and electron detection means disposed so as to detect the electrons provided by the photocathode crystal the improvement comprising the photocathode formed by a substrate, an active layer, and at least one bridging layer therebetween, each layer being a III-V compound of substantially constant composition of at least three III-V elements of the periodic table, the layers having progressively changing proportions of the at least three elements for progressively decreasing the energy gap of each successive layer and distributing the potential interlayer lattice mismatch that exists between the substrate and the active layer among the layers.

2. The photon detection apparatus as specified in claim 1, wherein the active layer is a relatively thin single crystal due to the distribution of lattice mismatch among the layers which mitigates the lattice mismatch between the active layer and the adjacent bridging layer.

3. The combination of claim 1 wherein the quality of each of the at least one bridging layer improves across the thickness thereof for providing a higher quality surface which minimizes interfacial dislocations in the succeeding layer.

4. The combination of claim 3 wherein each of the at least one bridging layers is at least 5 microns thick.

5. The combination of claim 1 wherein the thickness of the active layer is comparable to the diffusion length of free electrons within the active layer.

6. The combination of claim 1 wherein the thickness of the active layer is about 1 micron.

7. The combination of claim 1 wherein the substrate is a binary III-V compound.

* * * * *